(12) United States Patent
Kandala et al.

(10) Patent No.: US 7,239,626 B2
(45) Date of Patent: Jul. 3, 2007

(54) SYSTEM CLOCK SYNCHRONIZATION IN AN AD HOC AND INFRASTRUCTURE WIRELESS NETWORKS

(75) Inventors: Srinivas Kandala, Vancouver, WA (US); John Michael Kowalski, Camas, WA (US); Richard Thomas Bennett, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 552 days.

(21) Appl. No.: 10/882,918

(22) Filed: Jun. 30, 2004

(65) Prior Publication Data
US 2005/0169233 A1 Aug. 4, 2005

Related U.S. Application Data

(60) Provisional application No. 60/541,707, filed on Feb. 3, 2004.

(51) Int. Cl.
*H04Q 7/24* (2006.01)
(52) U.S. Cl. ....................... 370/349; 370/350
(58) Field of Classification Search ............ None
See application file for complete search history.

(56) References Cited

U.S. PATENT DOCUMENTS

| | | | |
|---|---|---|---|
| 6,594,273 B1 | 7/2003 | McGibney | |
| 7,145,837 B2 * | 12/2006 | Herring et al. | 368/46 |
| 2002/0131398 A1 | 9/2002 | Taylor | |
| 2003/0012168 A1 | 1/2003 | Elson et al. | |
| 2003/0117991 A1 | 6/2003 | Beyer et al. | |
| 2003/0151513 A1 | 8/2003 | Herrmann et al. | |
| 2004/0005902 A1 | 1/2004 | Belcea | |
| 2004/0008661 A1 | 1/2004 | Myles et al. | |

FOREIGN PATENT DOCUMENTS

WO   WO 2003073304 A1   9/2003

\* cited by examiner

*Primary Examiner*—Erika A. Gary
(74) *Attorney, Agent, or Firm*—Robert D. Varitz, PC

(57) ABSTRACT

A method of synchronizing clocks in the stations of ad hoc and infrastructure networks includes providing a time stamp field in a header; reading the header by all stations in a network; extracting the time stamp information from the header by each station in the network as time information; sending extracted time information to a station clock; and adjusting the station clock as a function of the extracted time information. A system for synchronizing clocks in the stations of ad hoc and infrastructure networks includes a DLL having a comparator for receiving the time stamp information and a low-pass filter having a long time-constant for adjusting the station clock in a gradual manner; a time stamp field in a header; and time information extracted from the time stamp information of the header by each station in the network.

14 Claims, 3 Drawing Sheets

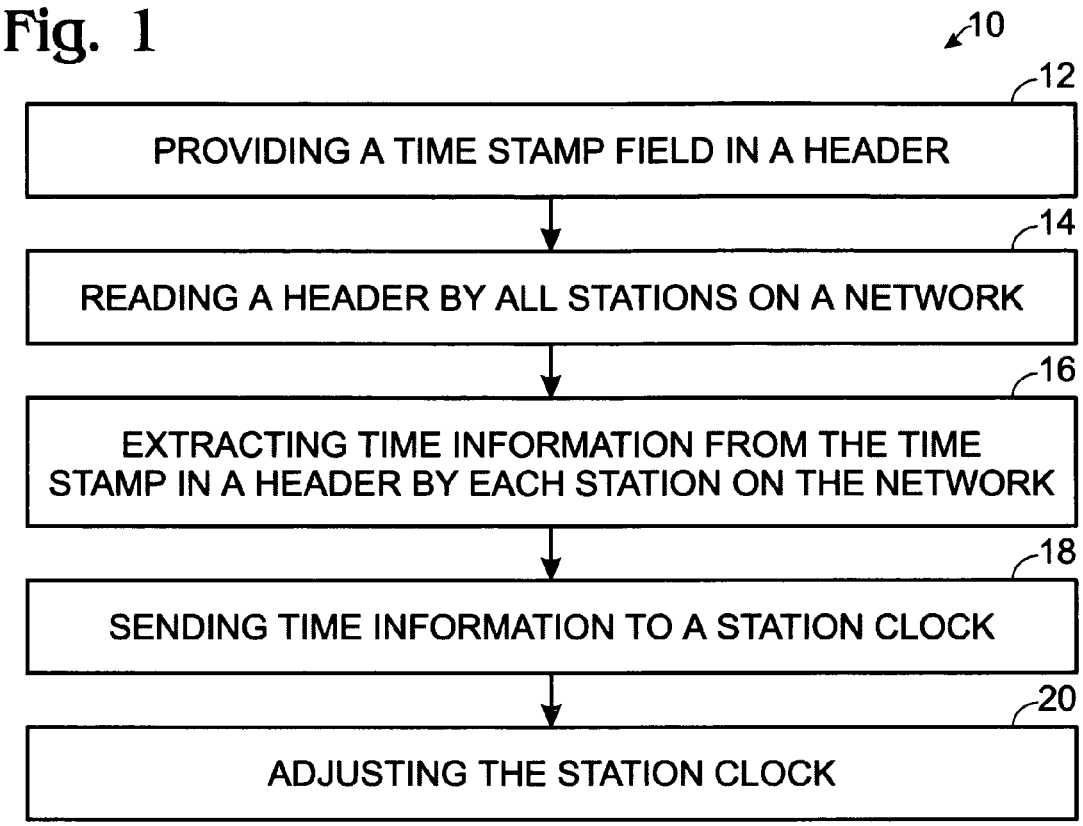
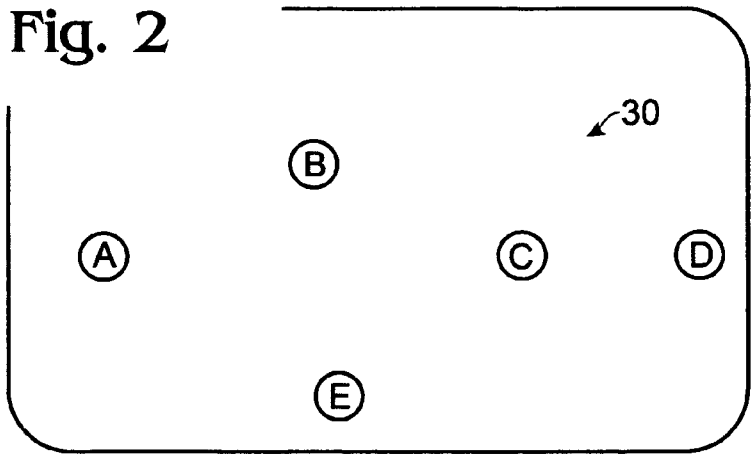

SYSTEM CLOCK SYNCHRONIZATION IN AN AD HOC AND INFRASTRUCTURE WIRELESS NETWORKS

RELATED APPLICATION

This application claims priority from U.S. Provisional Patent Application Ser. No. 60/541,707, for System Clock Synchronization in an Ad Hoc and Infrastructure Wireless Networks, filed Feb. 3, 2004.

FIELD OF THE INVENTION

This invention relates to clock synchronization for ad hoc wireless networks, and specifically to a modified PHY header including a time stamp field therein.

BACKGROUND OF THE INVENTION

High quality AV requires tight synchronization for MPEG-2TS, and for high quality audio broadcast in stereo, to different locations. These delay requirements are typically of the order of tens of nanoseconds.

In an ad hoc network especially, but also in situations where a Direct Link Protocol is used, as in 802.11e, the clock may not be accurate enough to meet these requirements or may not be able to meet synchronization requirements because of the presence of hidden stations. Without such synchronization capability, a higher "presentation" delay may be encountered as a result of attempts to synchronize from higher layers alone.

In a wireless network, stations transmit data to other data stations using Carrier-Sense Multiple Access/Collision Avoidance (CSMA/CA) as a primary mechanism to access the medium. For access to the medium, the stations must abide by certain channel access rules which include not occupying the medium for a certain time. Furthermore, when a station senses that the medium busy, it should backoff for a predetermined amount of time before again accessing the channel, to minimize the probability of collision. This requires that the clocks in all stations be synchronized. In the case of the delivery of data to certain applications, such as MPEG-2TS, or audio synchronization of remote outputs using IEEE 1394, tight clock synchronization between the transmitter and receiver, on the order of tens of nanoseconds, is required.

IEEE 802.11 defines mechanisms to synchronize clocks. In the so-called infrastructure mode, an Access Point (AP) maintains a clock, and distributes its value periodically. In an ad hoc network mode, the clock value is managed in a distributed manner. A station that "wins" contention at a particular instant, called Target Beacon Transmission Time or TBTT, will announce its clock value. During the next TBTT, a different station may win contention and send its own clock value.

While the mechanism in IEEE 802.11 is effective for both infrastructure and ad hoc modes, it makes an implicit assumption that there are no hidden stations, e.g., all stations can listen to other stations' transmissions. This assumption may not be valid in a typical home network using a PHY layer having a limited range, such as ultra-wide band (UWB), or when Direct Link Protocol (DLP) is used. This means that if two stations cannot hear each other, and one has transmitted its clock value, it is very likely that the other will also transmit its own clock value and the stations "hearing" both transmitted clock values may synchronize to different clocks at various times, preventing the synchronization throughout the network.

U.S. Pat. No. 6,594,273 B1, for Self-configuring radio network, to McGibney, granted Jul. 15, 2003, deals with a distributed synchronization for TDMA-based system. A special synchronization signal is transmitted at a specified time.

U.S. Patent Publication No. 2004/0008661 A1, for Method and apparatus for synchronization in a wireless network, of Myles et al., published Jan. 15, 2004, describes decoding information in a packet and copying data from a local free-running clock at a known reference point.

U.S. Patent Publication No. 2004/0005902 A1, for System and method for correcting the clock drift and maintaining the synchronization of low quality clocks in wireless networks, of Belcea, published Jan. 8, 2004, describes how synchronization may be achieved between a clock server and low-cost clock clients.

U.S. Patent Publication No. 2003/0151513 A1, for Self-organizing hierarchical wireless network for surveillance and control, of Herrmann et al., published Aug. 14, 2003, describes a self-organizing wireless network in which the ACK frames sent by some STAs may optionally contain time stamps.

U.S. Patent Publication No. US2003/0117991 A1, (WO2003055103) for Apparatus, and an associated method, for facilitating synchronization in a wireless mesh network, of Beyer et al., published Jun. 26, 2003, describes synchronization for a mesh network and ad hoc networks.

U.S. Patent Publication No. 2003/0012168 A1, for Low-latency multi-hop ad hoc wireless network, of Elson et al., published Jan. 16, 2003, describes synchronization for a mesh network.

U.S. Patent Publication No. 2002/0131398 A1 (WO2002073851) for Maintaining a global time reference among a group of networked devices, of Taylor, published Sep. 19, 2002, describes synchronization between the clocks of two different networks.

WO2003073304 for Personal profile sharing and management for short range wireless terminals, of Heinonen et al., published Sep. 4, 2003, describes a synchronization mechanism in ad hoc networks.

Other publications relevant to the disclosure herein include IEEE 802.11-1999 Std. 2003 Edition; Meyr et al., *Synchronization in Digital Communications: Volume* 1, John Wiley & Sons Inc., New York, 1990, and Ogata, *Modern Control Engineering*, Prentice Hall Inc., Englewood Cliffs, N.J., 1970.

SUMMARY OF THE INVENTION

A method of synchronizing clocks in the stations of ad hoc and infrastructure networks includes providing a time stamp field in a header; reading the header by all stations in a network; extracting the time stamp information from the header by each station in the network as time information; sending extracted time information to a station clock; and adjusting the station clock as a function of the extracted time information. A system for synchronizing clocks in the stations of ad hoc and infrastructure networks includes a DLL having a comparator for receiving the time stamp information and a low-pass filter having a long time-constant for adjusting the station clock in a gradual manner; a time stamp field in a header; and time information extracted from the time stamp information of the header by each station in the network.

It is an object of the invention to provide a method and mechanism for synchronization of station clocks for all stations in ad hoc and infrastructure networks.

Another object of the invention is to provide such synchronization by inserting a time stamp field into a PHY level message header.

Another object of the invention is to provide a means to synchronize the clocks in different stations in a network without using a conventional master/slave clock paradigm.

This summary and objectives of the invention are provided to enable quick comprehension of the nature of the invention. A more thorough understanding of the invention may be obtained by reference to the following detailed description of the preferred embodiment of the invention in connection with the drawings.

BRIEF DESCRIPTION OF THE DRAWINGS

FIG. 1 is a block diagram of the invention.
FIG. 2 schematically depicts an ad hoc network.

DETAILED DESCRIPTION OF THE PREFERRED EMBODIMENTS

Figure 3:
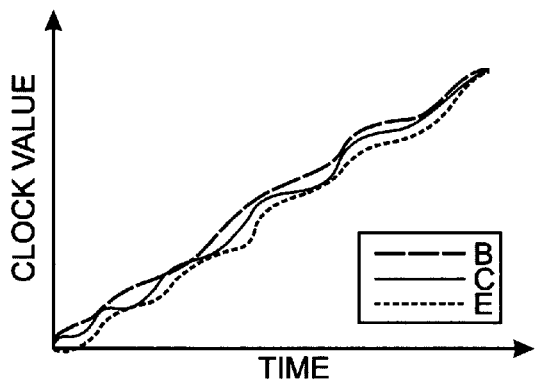
FIG. 3 depicts converging clock values.

High quality audio visual (AV) requires tight synchronization for MPEG-2TS and for high quality audio broadcast in stereo to different locations. These delay requirements are typically of the order of tens of nanoseconds.

The invention provides a means to synchronize the clocks in different stations (nodes) in a network without using a conventional master/slave clock paradigm. As previously noted, in an ad hoc network, such as in MAC's proposed for UWB applications, especially, but also in situations where a Direct Link Protocol (DLP) is used, as in infrastructure networks, such as 802.11e, the clock may not be sufficiently accurate to meet these requirements, or may not be able to meet these synchronization requirements because of the presence of hidden stations. This invention solves these problems by (1) providing a means to distribute time stamps; (2) use them to facilitate accurate timing synchronization, and (3) providing announcements of timing synchronization capability.

Important aspects of the invention described herein include (1) distribution of time stamps in ad hoc mode, both at the PHY layer, as well as the MAC layer, which relate to a "universal" system time; (2) the updating of all clocks in an ad hoc network, or within an infrastructure network based on one of several embodiments of clock recovery mechanisms; and (3) broadcast of synchronization capability to facilitate clock recovery.

This method of the invention synchronizes the clocks in all stations within a network. Instead of transmitting the clock value at a designated instant, the stations transmit the clock value in all frames they transmit. The clock value may be encoded in either the PHY header or in the MAC header. The receiving stations use the received clock value to set their own clocks, thus synchronizing all clocks in the network.

In the first embodiment of the invention, each receiving station replaces the value of its own clock with the received clock value. However, there is a potential problem with this technique if the station has to make a drastic adjustment to its own clock should it receive a frame from a station that has drifted substantially, or has just entered the network and has not fully synchronized itself to the system. This may affect a clock that is already being used to control other transmissions, especially the MPEG-2TS transport. In another embodiment, the received clock value is fed into a Delay Locked Loop (DLL) circuit whose output is fed to a low-pass filter, having a long time-constant, which ultimately adjusts the clock. This ensures that the synchronization is done in a more gradual manner without affecting the transport of the applications.

To ensure that all stations' clocks remain synchronized to the same value, included in the header in all data and management frames is a "Time Stamp" as shown in Table 1.

TABLE 1

| MAC frame format | | | | | | |
|---|---|---|---|---|---|---|
| Frame Type | Receiver Address | Transmitter Address | Time Stamp | Other header fields | Payload | CRC |
| MAC Header | | | | | | |

In another aspect of this embodiment, timing precision may be broadcast to all stations via a field in the "Capability Element," described in subclause 7.3.2.14 of reference IEEE 802.11, 1999, that is transmitted in beacon frames, association/reassociation frames, and probe response frames. This information may be used to update timing decisions based on clock recovery mechanisms described below.

In an alternative embodiment, the time stamp field is included in the PHY header, as shown in Table 2, i.e., within Physical Layer Convergence Procedure header.

TABLE 2

| Preamble | Time Stamp | Other PHY Fields | PHY CRC | MAC Header | Payload | MAC CRC |
|---|---|---|---|---|---|---|
| PHY Header | | | | | | |

There are many advantages in including the time stamp field in the PHY header: a station in the network usually does not decode the contents of the MAC header if the frame is not addresses to it; a station in the network may not be able to parse the frame as it is sent at a high rate—either because of a lack of capability or due to signal strength; the time stamp field, when placed in the PHY may be sent at the basic rate that is required to be supported by all stations; a station has much higher probability of decoding the PHY header than the MAC header as the conditions on the medium might change during the transmission of the frame. Furthermore, as the PHY header is much shorter it is less susceptible to random errors; and placement of the time stamp field in the PHY header minimizes the processing delay, as the MAC processing does not have to be taken into consideration. The time stamp field is a eight-octet field containing the time of day and an accuracy parameter.

Referring to FIG. 1, the method of the invention is depicted generally at 10. Most of the fields, such as frame type, receiver and transmitter heads and CRC are present in frame formats defined by most protocols or standards. The inclusion of time stamp field 12 in all frames is essential for this invention. The other fields are conventional. One of ordinary skill in the art will appreciate that the concept of time stamps is present in the prior art, however, the inclusion of a time stamp in all frames is not present in the known prior art. The time stamp field, in the preferred embodiments, is an 8-octet field and contains the time of the day, and the units which are determined by the desired accuracy, referred to herein as an accuracy parameter. For example, 50 nanoseconds may be selected as the clock tolerance in many AV applications is 100 nanoseconds. An 8-octet field provides the time stamp with a range of about 29,297 years. Thus, it is unlikely that there will ever be a wrap-around for this clock. While the method of the invention does not propose a specific reference point, one could select 0:00 UST, Jan. 1, 2004 C.E., as the time to initiate the clock. At the time the frame is to be transmitted by the PHY, the value of the locally-run clock will be acquired, the processing time added, and the time stamp inserted into the frame for transmission.

Upon receipt of this frame, any station which receives the frame will read 14 and decode the frame, retrieve the time stamp 16, add the processing time, and send the time value to clock circuitry 18. It should be noted that the transmission delay does not affect this value, as the scheme is used in a small area where the range is of the order of 10 meters. An electromagnetic wave takes about 33 ns to travel 10 meters, which is well below the resolution that the clock provides. The station adjusts its clock as a function of the extracted time information, 20.

Achieving Synchronization in the BSS

Synchronization may be achieved between the stations in a wireless network, as shown in FIG. 2, which depicts an ad hoc network generally at 30, without using master/slave configuration of the clocks.

Station A begins the ad hoc network. Station B subsequently comes "online." If there are frames from station A, such as a beacon or other configuration frames, station B adjusts its clock value, i.e., the register which the clock drives. It should be noted that while the clock value itself is adjusted, the clock continues to be free running. If there are no frames from station A, station B transmits a frame allowing station A to adjust its own clock value. As stations C, D and E subsequently join the network, they adjust their clock values based on the frames that are transmitted on the medium, even if they are not the recipients of the frames, thereby achieving synchronization.

Synchronization is maintained as stations receive frames from other stations, even though their clocks are free running. This is because any difference in the clock value due to the drift occurring in one station's clock with that of another station's clock is reduced when the first station receives a frame from the second station and is further reduced if the second station receives a frame from the first station. FIG. 3 depicts how the clock values for stations B, C and E continue to converge toward each other.

Assume that a clock value in a station has drifted significantly after some time, perhaps because of a lack of activity. Also, to more clearly illustrate this embodiment, assume that station B and station E are hidden as to each other. As station C begins transmitting frames, it reduces the difference in its clock value with that of station B, and that of station E. When station B transmits frames, the difference between station B's clock and station C's clock is initially reduced. As station C transmits its frames, the difference between station C's clock and station E's clock is reduced and consequently the difference between station B's clock and station E's clock is reduced. This bootstrapping continues to force the clock drift to a smaller value. One of ordinary skill in the art will understand that the drift will never be zero, as no two clocks will ever be perfectly synchronized. Thus, in this embodiment, the clock at the receiver is updated with the processed value of the time stamp.

Figure 4:
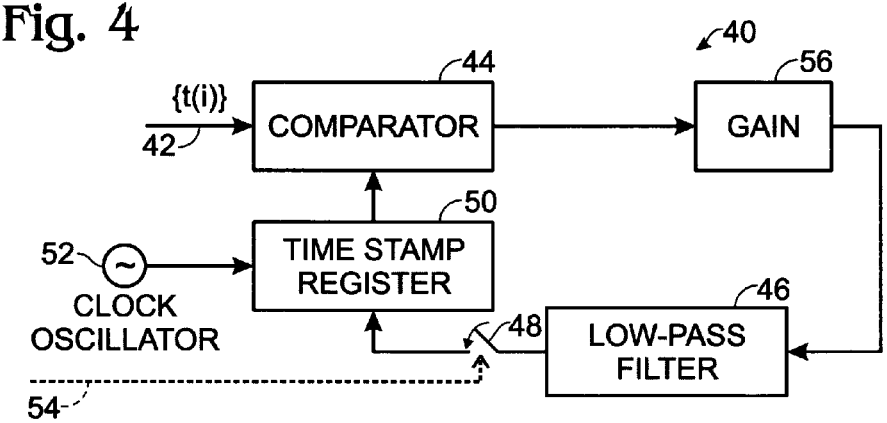
FIG. 4 is a block diagram depicting aperiodic updates of a clock using a DLL.

Another embodiment of the invention is depicted in FIG. 4, generally at 40. The received time stamp values 42, adjusted to the processing time, t(i), are sent to a comparator 44 of a DLL, and transits a low-pass filter, 46. The output of low-pass filter 46 is sent through a switch 48 to a time stamp register 50, which also reads the output of a clock oscillator 52, in a controlled manner so that the adjustment of the clock value is done only when there is a sample available. Switch 48 is activated by the availability of a sample value, shown in dashed line 54, which is an extension of the time stamp value 42. A gain element 56 may be adjusted, based on a coarse measurement of the received time stamp; e.g., packets which arrive from stations that infrequently transmit and are sufficiently delayed with respect to other stations, and are weighted less than those received from more frequently transmitting stations.

Figure 5:
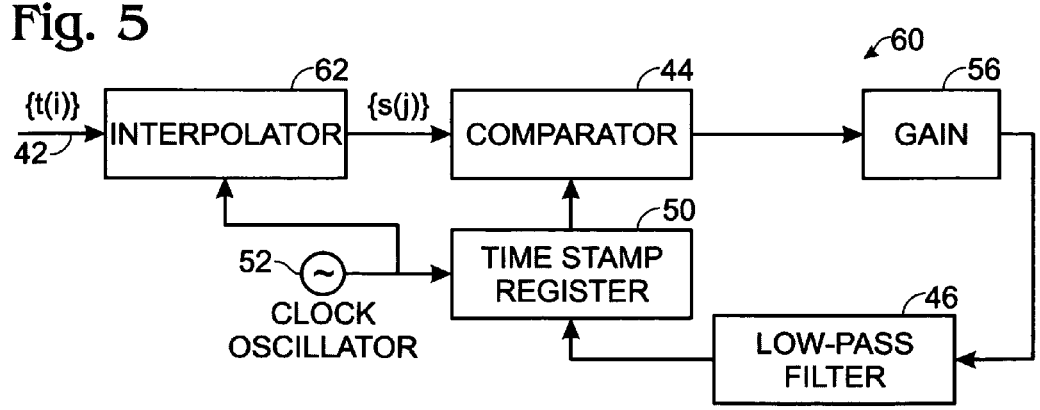
FIG. 5 is a block diagram depicting periodic updates of a clock using a DLL.

Another embodiment is depicted in FIG. 5, generally at 60. In this embodiment, the received samples are passed through an interpolator 62 which provides periodic input to the comparator. The advantage of this embodiment over the previous embodiment is that switch 48 is not required to control when the register is provided an input.

In another aspect of the above embodiments, as the capability information provides an indication of synchronization precision, the precision information is used to weight the input that a particular timing sample has to the low pass filter by varying the gain: a coarser precision results in a smaller gain, while a greater precision is weighted more, and results in a larger gain. This accommodates use of legacy or low cost devices, while still providing greater accuracy as more accurate synchronization methods become more prevalent, especially for the use of high quality AV transmission.

In another aspect of the above clock recovery mechanisms, if time stamps used in the MAC header are provided and used in the method of the invention and system of the invention, timing may be improved based on receipt of acknowledged packets, by the recipient station, which provides give an affirmative indication of when the data that the recipient station is using to update its clocks. This timing may then be used to give a more reliable estimate, albeit delayed, and weighted because that the samples are received earlier in time. This information may also then be used to construct a "full state feedback" delay tracking loop, which attempts to estimate the delay of all tracking loops in the BSS FIG. 6 shows a full state feedback mechanism based on the third embodiment of the clock recovery mechanism.

Figure 6:
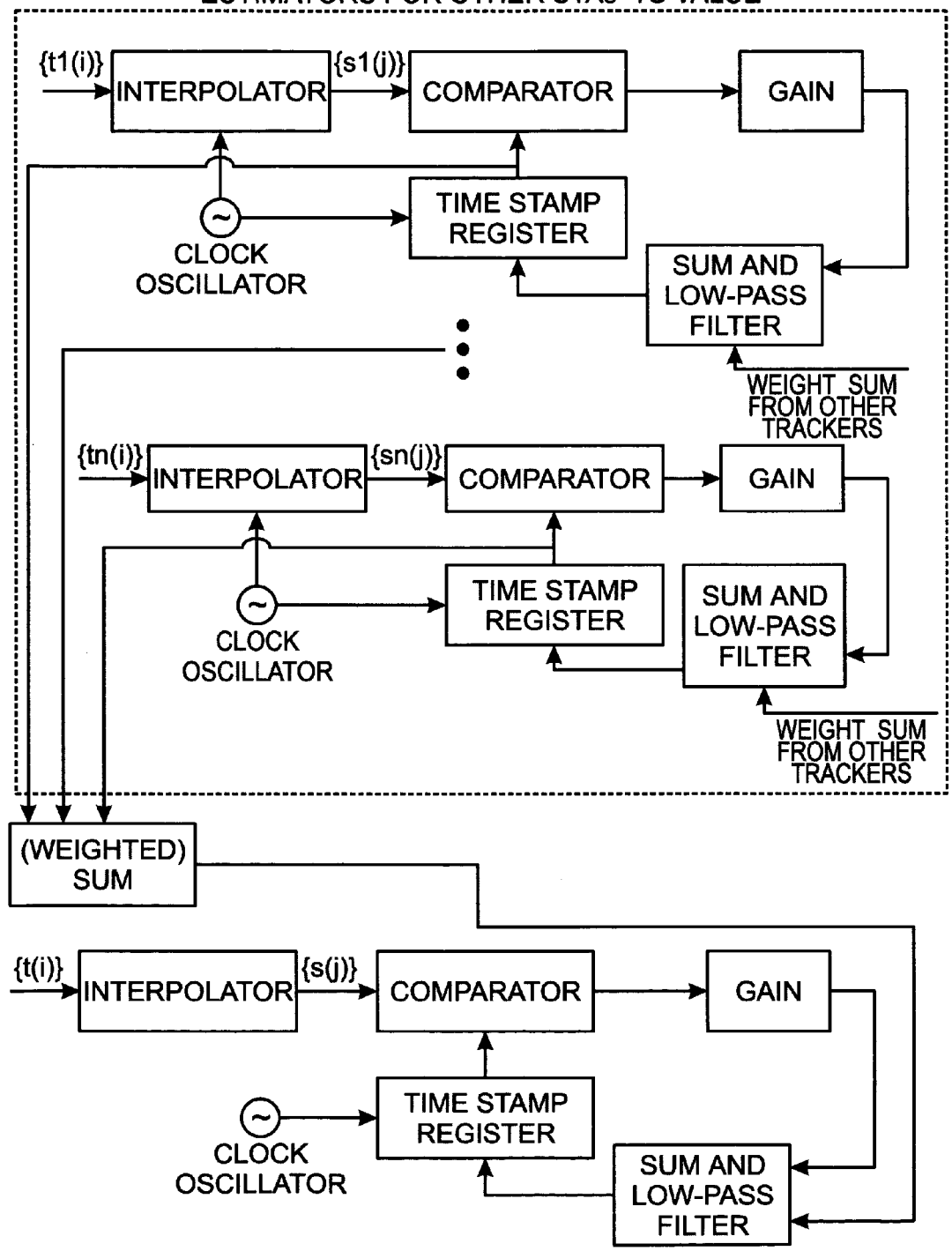
FIG. 6 is a block diagram depicting full state feedback clock updating.

The preferred embodiment is a combination of the first embodiment and the remaining embodiments, depicted in FIGS. 4-6, depending on whether the clock is being acquisitioned for the first time or whether the clock is in a tracking mode.

Thus, a method and system for system clock synchronization in ad hoc and infrastructure wireless networks has been disclosed. It will be appreciated that further variations and modifications thereof may be made within the scope of the invention as defined in the appended claims.

We claim:

1. A method of synchronizing clocks in the stations of ad hoc and infrastructure networks comprising:

providing a time stamp field in a header;

reading the header by all stations in a network;
extracting time stamp information from the header by each station in the network as time information;
sending extracted time information to a station clock;
adjusting the station clock as a function of the extracted time information; and
providing a Delay Locked Loop (DLL) having a comparator for receiving the time stamp information and a low-pass filter having a long time-constant for adjusting the station clock in a gradual manner.

2. The method of claim 1 wherein the time stamp field is located in a MAC header.

3. The method of claim 1 wherein the time stamp field is located in a PHY header.

4. The method of claim 1 wherein the time stamp field is an eight-octet field containing the time of day and an accuracy parameter.

5. The method of claim 1 which includes providing a switch after the low-pass filter to control transmission of the time information to the station clock.

6. The method of claim 1 which includes providing a gain element for adjusting a weight value applied to the time information.

7. The method of claim 1 which includes providing an interpolator for providing periodic input to the comparator.

8. A system for synchronizing clocks in the stations of ad hoc and infrastructure networks comprising:
a Delay Locked Loop (DLL) having a comparator for receiving time stamp information and a low-pass filter having a long time-constant for adjusting the station clocks in a gradual manner;
a time stamp field in a header; and
time information extracted from the time stamp information of the header by each station in a network.

9. The system of claim 8 which includes a switch after the low-pass filter to control the transmission of the time information to the station clocks.

10. The system of claim 8 which includes a gain element for adjusting a weight value applied to the time information.

11. The system of claim 8 which includes an interpolator for providing periodic input to the comparator.

12. The system of claim 8 wherein the time stamp field is located in a MAC header.

13. The system of claim 8 wherein the time stamp field is located in a PHY header.

14. The system of claim 8 wherein the time stamp field is an eight-octet field containing the time of day and an accuracy parameter.

* * * * *